United States Patent
Giraudy et al.

(10) Patent No.: US 6,947,814 B2
(45) Date of Patent: Sep. 20, 2005

(54) PROCESS AND DEVICE FOR ESTIMATING AT LEAST THE VERTICAL SPEED OF AN AIRCRAFT, IN PARTICULAR OF A ROTARY WING AIRCRAFT

(75) Inventors: Jean-Louis Giraudy, Plan de Cuques (FR); Jean-Paul Petillon, Miramas (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 10/443,138

(22) Filed: May 22, 2003

(65) Prior Publication Data

US 2003/0233175 A1 Dec. 18, 2003

(30) Foreign Application Priority Data

May 23, 2002 (FR) .............................................. 02 06272

(51) Int. Cl.[7] .............................................. G06F 19/00
(52) U.S. Cl. .............................................. 701/5; 701/7
(58) Field of Search .............................. 701/3, 4, 5, 7, 701/8; 340/969, 970, 977, 978

(56) References Cited

U.S. PATENT DOCUMENTS

| 3,715,718 | A | | 2/1973 | Astengo |
| 3,743,221 | A | | 7/1973 | Lykken et al. |
| 4,129,275 | A | * | 12/1978 | Gerstine et al. ............ 244/181 |
| 5,349,347 | A | | 9/1994 | Muller |
| 5,781,126 | A | | 7/1998 | Paterson et al. |
| 6,298,287 | B1 | * | 10/2001 | Tazartes et al. ................ 701/4 |
| 6,324,448 | B1 | * | 11/2001 | Johnson ......................... 701/7 |

* cited by examiner

*Primary Examiner*—Michael J. Zanelli
(74) *Attorney, Agent, or Firm*—Stevens, Davis, Miller & Mosher, LLP

(57) ABSTRACT

A process for estimating the vertical speed of a rotary wing aircraft may include integrating the sum of: (1) a first component corresponding to a vertical acceleration measurement and (2) a second component obtained from the difference between: (a) a first value incorporating a barometric measurement and (b) a second value incorporating a previous estimation of the vertical speed. The second component is derived from the difference between the first and second values by clipping this difference to eliminate, as appropriate, the part of the difference which is greater, in absolute value, than a predetermined value.

2 Claims, 2 Drawing Sheets

PROCESS AND DEVICE FOR ESTIMATING AT LEAST THE VERTICAL SPEED OF AN AIRCRAFT, IN PARTICULAR OF A ROTARY WING AIRCRAFT

FIELD OF THE INVENTION

The present invention relates to a process and a device for estimating at least the vertical speed and possibly the altitude of an aircraft, in particular of a rotary wing aircraft.

BACKGROUND OF THE RELATED ART

It is known to measure the altitude and the vertical speed of an aircraft, for example of a rotary wing aircraft, with the aid of barometric capsules which carry out barometric measurements. However, such barometric measurements which are accurate at high altitude exhibit considerable errors at low altitude, especially in the case of a rotary wing aircraft, such as a helicopter for example, by virtue of the existence of a ground effect specified hereinbelow.

It is known that the lift of a helicopter is based on the equality between the thrust of the main rotor and the weight of the helicopter. Normally, in particular at high altitude, the discontinuity in pressure encountered in an air jet passing through the disk of the main rotor consists essentially of a pressure reduction on the suction surface, this not disturbing the operation of a barometric capsule intended for measuring the barometric altitude, whose static-pressure taps are arranged on the fuselage of the helicopter, that is to say at the level of the pressure surface. However, at low altitude [for example at an altitude of less than 18 meters (60 feet)], the flow of the air stream interacts with the ground and an overpressure is created under the disk of the main rotor giving rise to the above-indicated ground effect. In this case, the levitating force is of course still the same, but the new equilibrium is based almost entirely on the overpressure prevailing between the rotor disk and the ground. By virtue of the considerable size of a helicopter main rotor, the entire fuselage is situated in this overpressure field and hence also the static-pressure taps of a barometric capsule, thereby giving rise to a considerable error during the measurement of the barometric altitude by means of such a barometric capsule. A similar error appears in the measurement, at low altitude, of the barometric vertical speed, that is to say of the vertical speed of the aircraft which is based on a barometric measurement.

In order to at least partially remedy these drawbacks, it is known to use a value of vertical acceleration which is measured by an attitude and heading unit of the aircraft, so as to filter (and hence correct) the barometric altitude measurement used during the estimation of the vertical speed and/or of the altitude of an aircraft. Various filters formed for this purpose are known.

In a general manner, by virtue of such filters, (called "vertical loops"), the estimated vertical speed is obtained by the integration of the sum:
  of a first component corresponding to a vertical acceleration measurement, and
  of a second component obtained from the difference between a first value incorporating a barometric measurement (barometric altitude or barometric vertical speed) and a second value incorporating (directly or after integration) a previous estimation of said vertical-speed.

Although they make it possible to reduce the errors in the estimation of the vertical speed of the aircraft, such filters do not give rise to a sufficient error reduction as to allow the use of this estimation at low altitude. Furthermore, as the pilot uses the vertical speed measurement as piloting reference and as the errors are spread over time, the piloting errors stemming therefrom could be very considerable and highly consequential. In particular, an underestimated speed would have the consequence of prompting the pilot to increase the speed with the risk of reaching the aircraft's power limit and of exiting the permitted flight domain.

SUMMARY OF THE INVENTION

The object of the present invention is to remedy these drawbacks. It relates to a process making it possible to provide an accurate and reliable estimation of the vertical speed of an aircraft, in particular of a rotary wing aircraft, whatever its altitude, and hence also at low altitude.

For this purpose, according to the invention, said process according to which the estimated vertical speed is obtained by the integration of the sum:
  of a first component corresponding to a vertical acceleration measurement, and
  of a second component obtained from the difference between a first value incorporating a barometric measurement and a second value incorporating a previous estimation of said vertical speed,
is noteworthy in that said difference is clipped by eliminating, as appropriate, the part of said difference which is greater, in absolute value, than a predetermined value.

Thus, by virtue of the invention, the differences which exhibit high values are clipped. High values such as these originate essentially from said barometric measurement and represent barometric measurement errors which are due to the aforesaid ground effect. Such errors exhibit, as is known, short durations and very high amplitudes, whatever the type of the aircraft and whatever its size.

Consequently, by limiting (through clipping) the effect of any barometric measurement errors, which appear at low altitude (at touchdown and on takeoff of a rotary wing aircraft in particular), one obtains a very accurate estimation of the vertical speed of the aircraft at low altitude and hence also over the entire flight domain, since the only defects of accuracy of the aforesaid known process appear at low altitude, in particular in the case of a rotary wing aircraft at an altitude of less than 1.5 times the diameter of the main rotor of this aircraft.

In a first embodiment, said first value is a barometric vertical speed which is obtained by differentiation of a barometric altitude measurement and said second value is an estimated vertical speed.

In a second embodiment, said first value is a barometric altitude measurement and said second value is an altitude estimation obtained by the integration of an estimated vertical speed.

In this case, preferably, to obtain the clipping of said difference, said altitude estimation is clipped.

According to the invention, the vertical speed is estimated repetitively and the vertical speed obtained during a previous estimation is used to form the second value used during a current estimation.

Furthermore, in a particular embodiment, an estimation of the altitude is moreover determined, by integrating the sum:
  of a third component corresponding to said estimated vertical speed;
  of a fourth component obtained from the difference between a barometric altitude measurement and a previous estimation of said altitude.

Additionally, advantageously, said clipping is temporarily suspended when one of the following conditions is satisfied:
  the aircraft is in a banking phase;
  the speed of the aircraft with respect to the air is greater than a predetermined speed; and an attitude and heading unit of the aircraft is in the alignment phase.

The present invention also relates to a device for estimating, accurately, at least the vertical speed of an aircraft, especially of a rotary wing aircraft, whatever its altitude.

To do this, according to the invention, said device of the type comprising:

- a first means for measuring a vertical acceleration of the aircraft;
- a second means for carrying out a barometric measurement;
- a third means for forming a component from the difference between a first value incorporating said barometric measurement and a second value incorporating an estimation of the vertical speed;
- a fourth means for carrying out the sum of said measured vertical acceleration and of said component; and
- a fifth means for integrating said sum in such a way as to form the vertical speed to be estimated, is noteworthy in that it furthermore comprises a sixth means for clipping said difference by eliminating, as appropriate, the part of said difference which is greater, in absolute value, than a predetermined value [for example 0.5 m/s (100 feet/minute) or 15 meters (50 feet)].

Preferably, said first means is an attitude and heading unit mounted on the aircraft.

Furthermore, in a first embodiment, said second means comprises a barometric capsule mounted on the aircraft and measuring the static pressure so as to provide a barometric altitude measurement. In a second embodiment, said second means comprises, mounted on the aircraft:

- a barometric capsule which measures the static pressure; and
- an auxiliary means which carries out a (mathematical) differentiation of this static pressure so as to provide a barometric vertical speed measurement.

Additionally, the device in accordance with the invention also comprises, advantageously:

- a seventh means for integrating the sum of the vertical speed formed by said fifth means and of a component obtained from the difference between, on the one hand, a barometric altitude measured by said second means and, on the other hand, a previous estimation of the altitude, in such a way as to form an estimated altitude of the aircraft; and/or
- an eighth means for temporarily suspending the clipping implemented by said sixth means.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
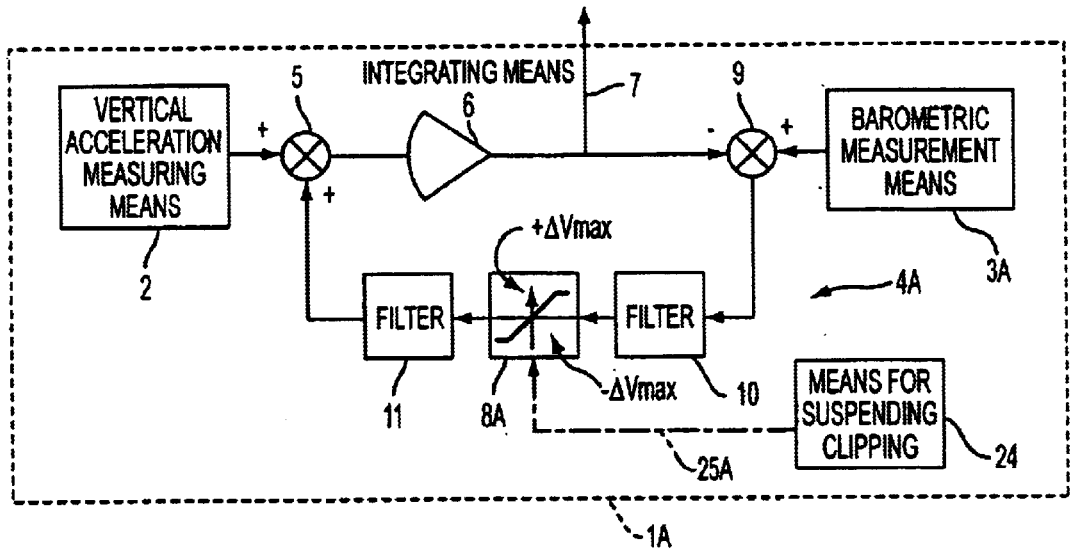
FIGS. 1 to 4 show the schematic diagrams of a device for estimation in accordance with the invention, respectively according to four different embodiments.

The device in accordance with the invention and represented according to four different embodiments 1A, 1B, 1C and 1D respectively in FIGS. 1 to 4, is intended to estimate at least the vertical speed Vvib of an aircraft (not represented), in particular of a rotary wing aircraft such as a helicopter.

Said device 1A, 1B, 1C, 1D is of the type comprising:

- a means 2 for measuring a vertical acceleration $\gamma v$ of the aircraft;
- a means 3A, 3B for carrying out a barometric measurement Vvb, Zb;
- a means 4A, 4B, 4C, 4D for forming a component from the difference between a first value incorporating said barometric measurement received from the means 3A, 3B and a second value incorporating an estimation of the vertical speed (directly or after integration);
- a means 5 for carrying out the sum of said vertical acceleration $\gamma v$ measured by the means 2 and of said component calculated by said means 4A, 4B, 4C, 4D; and
- a means 6 for integrating said sum (received from the means 5) in such a way as to form the vertical speed Vvib to be estimated, which is available by means of a link 7.

According to the invention, said device 1A, 1B, 1C and 1D moreover comprises a means 8A, 8B, 8C and BD for clipping the difference formed by the means 4A, 4B, 4C and 4D by eliminating, as appropriate, the part of said difference which is greater, in absolute value, than a predetermined value $\Delta$Vmax, $\Delta$Zmax specified hereinbelow.

Thus, by virtue of the invention, the differences which exhibit high values are clipped. High values such as these originate essentially from said barometric measurement Vvb, Zb (means 3A, 3B) and represent barometric measurement errors which are due to a ground effect giving rise to an overpressure between the ground and the aircraft, in the zone of measurement of the means 3A, 3B. Such measurement errors exhibit, as is known, short durations and very high amplitudes, whatever the type of the aircraft and whatever its size.

Consequently, by limiting (through clipping) the effect of any barometric measurement errors, which appear at low altitude (at touchdown and on takeoff of a rotary wing aircraft in particular), one obtains a very accurate estimation of the vertical speed Vvib of the aircraft at low altitude and hence also over the entire flight domain, since the main defects (thus corrected) of accuracy appear essentially at low altitude.

Said means 2 is a standard attitude and heading unit (of the "AHRS" type: "Attitude and Heading Reference System" for example) which is mounted on the aircraft and which, in a known manner, makes it possible to determine a vertical acceleration $\gamma v$.

Figure 2:
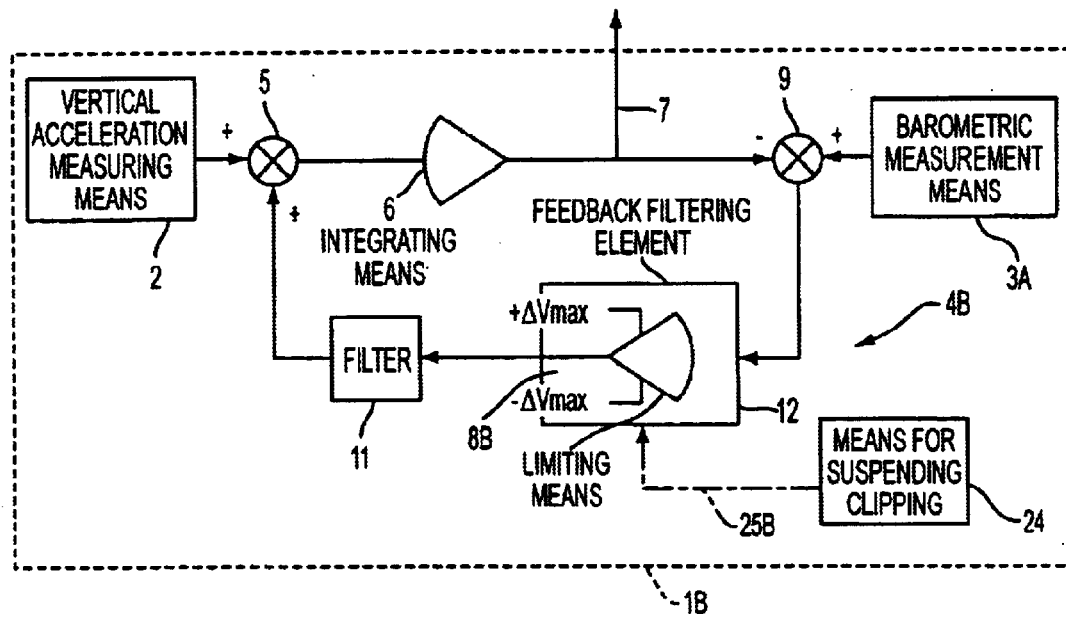

In the embodiment of FIGS. 1 and 2, said means 3A provides a barometric vertical speed measurement Vvb. For this purpose, said means 3A comprises, mounted on the aircraft and not represented:

- a standard barometric capsule, which measures the static pressure; and
- a standard auxiliary means (pneumatic device or means of calculation), which carries out a (mathematical) differentiation of this static pressure so as to provide a measurement of the barometric vertical speed Vvb.

Additionally, said means 4A comprises a means of calculation 9 which computes the difference between the barometric vertical speed Vvb provided by the means 3A and the vertical speed Vvib estimated during a previous estimation.

The device 1A represented in FIG. 1 further comprises a feedback filter which is split into two filtering elements 10 and 11 with respective transfer functions F1 and F2. The transfer function F1 is of the "low-pass" type with a much higher cutoff frequency than the overall cutoff frequency of the filter in closed loop. The clipping means 8A is mounted between these two filtering elements 10 and 11.

In this way, the unwanted components of the discrepancy signal (Vvb-Vvib) are eliminated before clipping. It is possible to choose F1 and F2 in such a way that their product is equal to the standard transfer function without means 8A, thereby guaranteeing identical operation in the small signals regime (that is to say in the absence of any spike from errors when entering the ground effect or when exiting the ground effect).

This embodiment of FIG. 1 nevertheless has a drawback due to the fact that the filtering element F1 is of "low-pass" type. Specifically, in the presence of error spikes, the output state has altered in a nonzero time (after-effect), beyond the clipping threshold.

Consequently, the return of the filter to the linear regime (that is to say, to the state where the clipping is no longer relevant) will take a certain time, this having the effect of increasing the weight of the error which is injected into the loop.

The embodiment 1B of FIG. 2 makes it possible to remedy this drawback.

To do this, the means 8B is integrated directly into the element 10 to form a feedback filtering element 12. The means 8B will limit the fluctuation in the output state variable of this feedback filter so that the weight of the injected error is much lower than in the embodiment of FIG. 1A. The speed difference (Vvib-Vvb) is limited to ±ΔVmax, ΔVmax being for example equal to 100 feet/minute (0.5 m/s).

Figure 3:
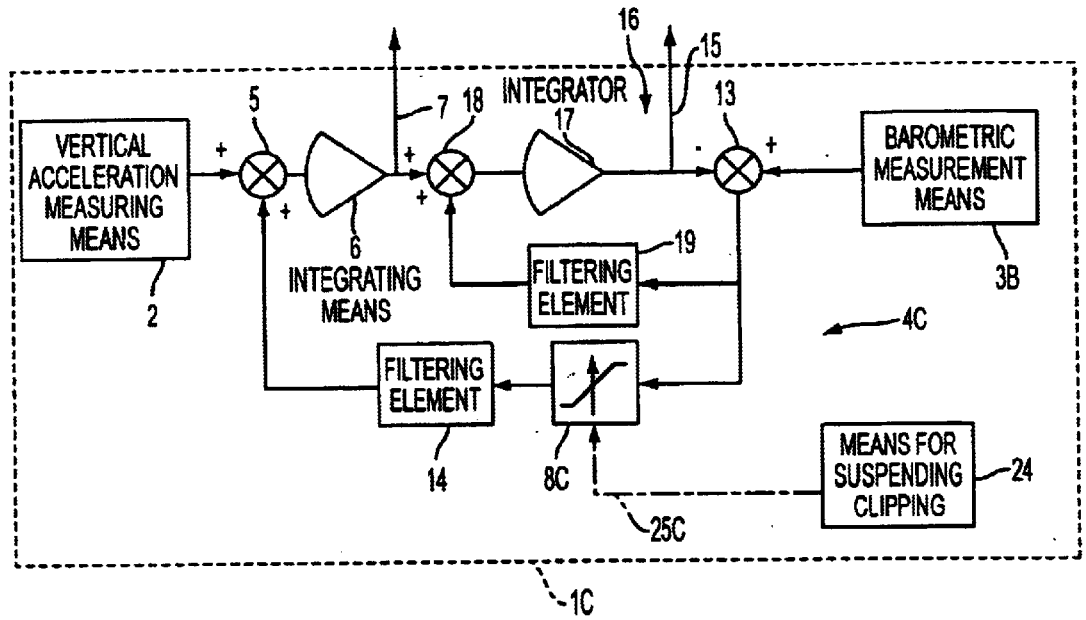
Figure 4:
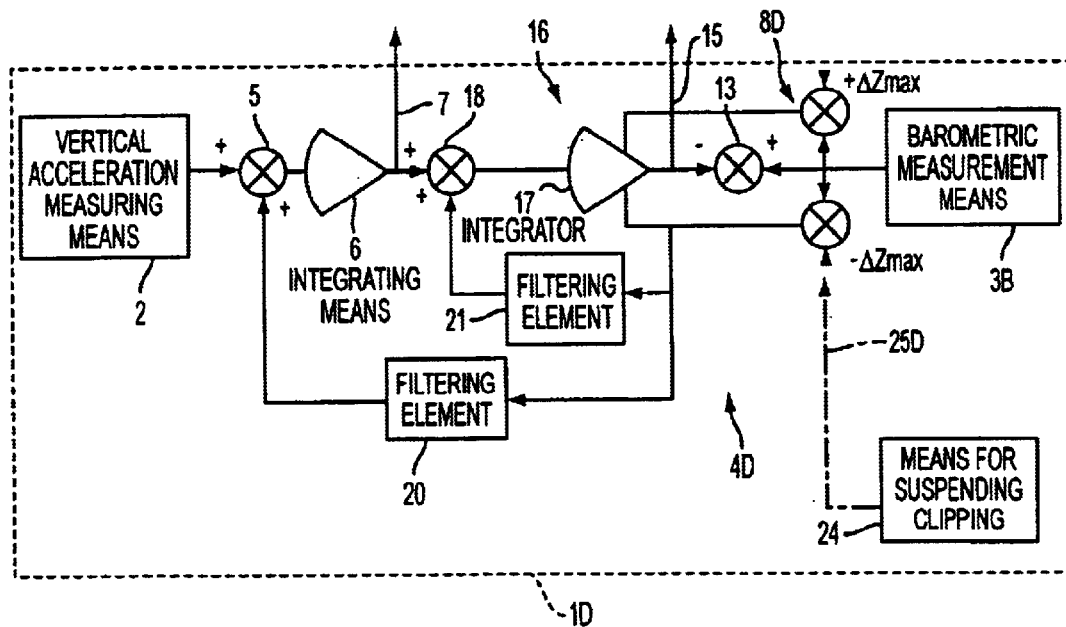

Additionally, in the embodiments of FIGS. 3 and 4, the means 3B provides a barometric altitude measurement Zb. For this purpose, this means 3B comprises a standard barometric capsule (not represented), mounted on the aircraft and measuring the static pressure.

Furthermore, the means 4C, 4D comprises a means of calculation 13 which computes the difference between the barometric altitude Zb measured by the means 3B and an estimated altitude value Zib incorporating the estimated vertical speed Vvib and specified hereinbelow.

In these embodiments, the means 8C, 8D does not carry out the clipping of a vertical speed difference, but the clipping of an altitude difference emanating from the means of calculation 13.

The device 1C furthermore comprises a filtering element 14 which is mounted between said means 8C and the summator 5.

Said device 1C provides, in addition to a vertical speed estimation Vvib, an altitude estimation Zib which is available by means of a link 15.

This estimated altitude Zib is obtained with the aid of a means 16 which comprises an integrator 17 which integrates the result of a sum provided by a summator 18. This summator 18 computes the sum of an estimation of the vertical speed Vvib provided by the integrator 6 and of a component representing the aforesaid difference emanating from the means of calculation 13 and which is filtered by a filtering element 19.

The two filtering elements 14 and 19 may be of any order. The order of the overall filter corresponds to the sum, increased by 2, of the orders of the two corresponding transfer functions. By acting on these filtering elements 14 and 19 it is possible to optimize the selectivity between the vertical acceleration and the barometric altitude.

Additionally, the embodiment 1D of FIG. 4 is similar to that 1C or FIG. 3 and comprises filtering elements 20 and 21 which are of the same type as the filtering elements 14 and 19 of FIG. 3. However, the object of the means 8D is to directly limit the fluctuation of the integrator 17, rather than to carry out the clipping of the signal emanating from the means of calculation 13. Thus, the altitude Zib emanating from the integrator 17 is limited to an altitude Zb±ΔZmax, ΔZmax being equal for example to 50 feet (15 meters).

Additionally, according to the invention, said device 1A, 1B, 1C and 1D moreover comprises a means 24 for temporarily suspending the clipping implemented by the means 8A, BB, BC and BD, as is illustrated by a chain-dotted link 25A, 25B, 25C and 25D. In a preferred embodiment, said means 24 temporarily suspends said clipping, when one of the following conditions is satisfied:
- the aircraft is in a banking phase (with maintenance of the temporary suspension of the clipping for a predefined duration after a return to horizontal flight);
- the speed of the aircraft with respect to the air is greater than a predetermined speed; and
- an attitude and heading unit (not represented) of the aircraft is in the alignment phase.

It will be noted that this means 24 makes it possible to eliminate a negative secondary effect of the clipping implemented by the means 8A, 8B, 8C and 8D in accordance with the invention. This secondary effect (of the clipping which is envisaged in the feedback loop), is the considerable increasing of the duration of estimation of a new bias of vertical acceleration, in the event of a fast and large-amplitude variation of said bias.

What is claimed is:

1. A process for estimating the vertical speed of a rotary wing aircraft, according to which process the estimated vertical speed is obtained by the integration of the sum of:
   a first component corresponding to a vertical acceleration measurement, and
   a second component obtained from the difference between a first value incorporating a barometric measurement and a second value incorporating a previous estimation of said vertical speed,
   wherein said difference is clipped by eliminating, as appropriate, the part of said difference which is greater, in absolute value, than a predetermined value, and
   wherein an altitude estimation is moreover determined, by integrating the sum of:
   a third component corresponding to said estimated vertical speed; and
   a fourth component obtained from the difference between a barometric altitude measurement and a previous estimation of said altitude.

2. A device for estimating the vertical speed of a rotary wing aircraft, said device comprising:
   a first means for measuring a vertical acceleration of the aircraft;
   a second means for carrying out a barometric measurement;
   a third means for forming a component from the difference between a first value incorporating said barometric measurement and a second value incorporating a previous estimation of the vertical speed;
   a fourth means for carrying out the sum of said measured vertical acceleration and of said component;
   a fifth means for integrating said sum in such a way as to form the vertical speed to be estimated;
   a sixth means for clipping said difference by eliminating, as appropriate, the part of said difference which is greater, in absolute value, than a predetermined value; and
   a seventh means for integrating the sum of the estimated vertical speed formed by said fifth means and a component obtained from the difference between, on the one hand, a barometric altitude measured by said second means and, on the other hand, a previous estimation of the altitude, in such a way as to form an estimated altitude of the aircraft.

* * * * *